Oct. 5, 1954  R. W. BROWN  2,690,692
LATHE WITH CHIP-BREAKING MECHANISM
Filed Sept. 27, 1949  3 Sheets-Sheet 1
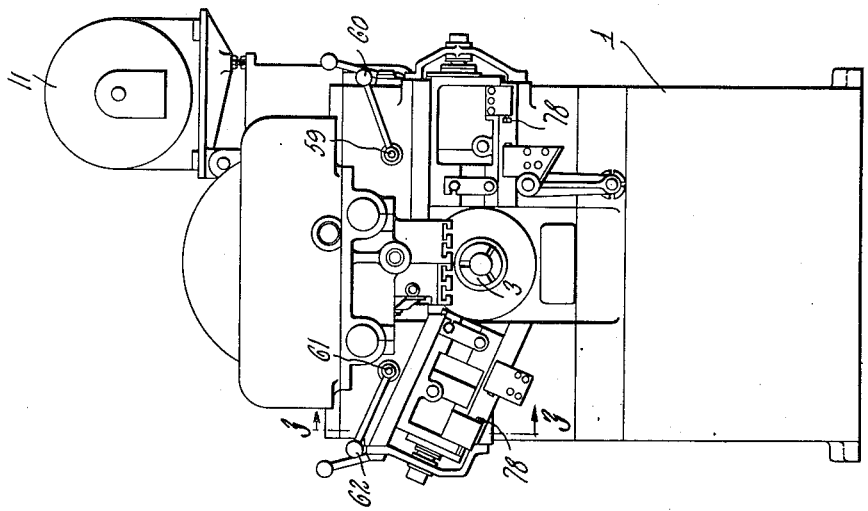
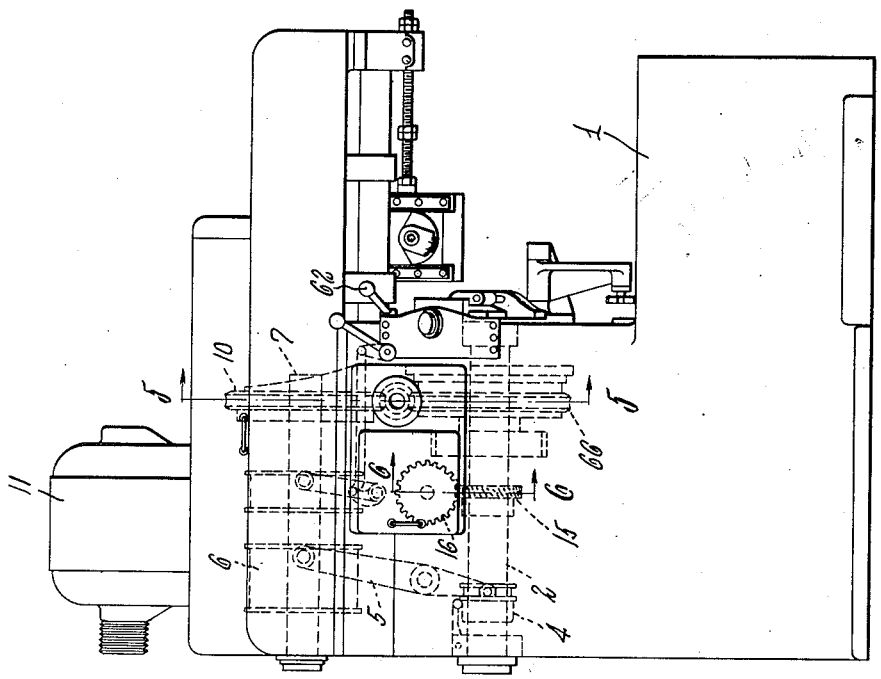
Inventor
Roger W. Brown

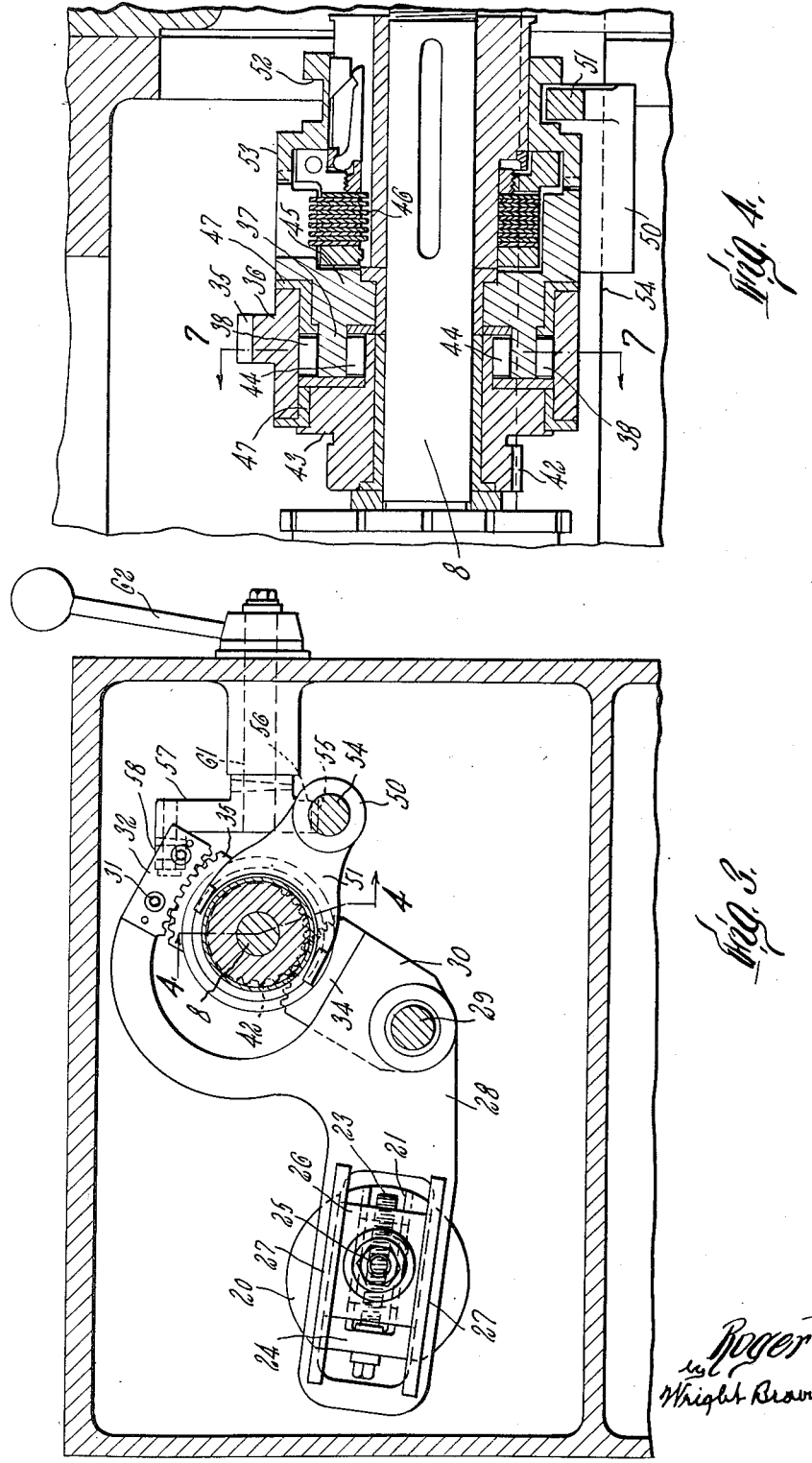

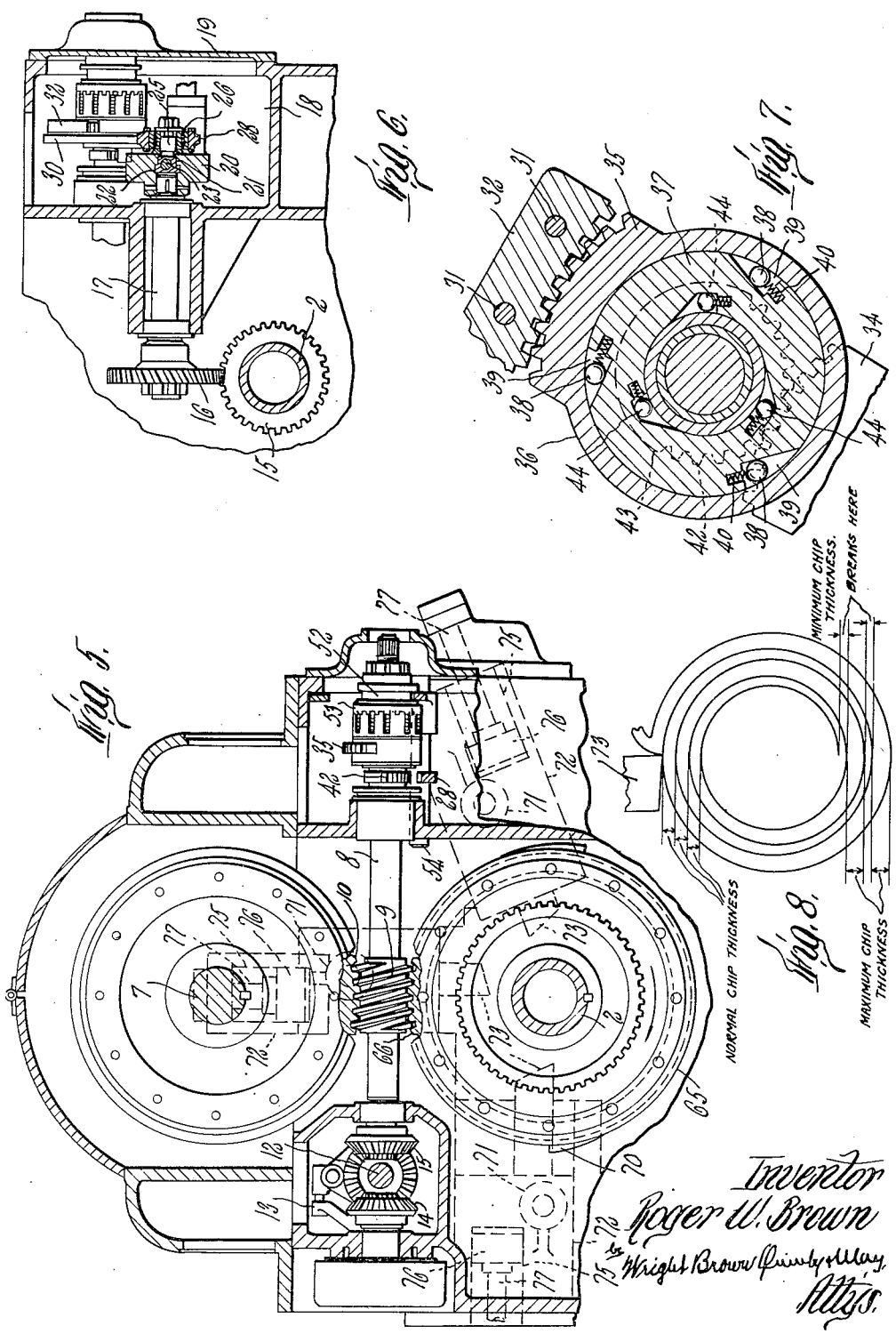

Patented Oct. 5, 1954

2,690,692

UNITED STATES PATENT OFFICE 2,690,692

LATHE WITH CHIP-BREAKING MECHANISM

Roger W. Brown, Windsor, Vt., assignor to Cone Automatic Machine Company Inc., Windsor, Vt., a corporation of Vermont Application September 27, 1949, Serial No. 118,083

5 Claims. (Cl. 82—24)

This invention has for an object to provide, in a lathe, mechanism by which a chip removed from a metal work piece during turning is caused to break into short lengths. This avoids the danger and annoyance incident to the thrashing about of long chips during a turning operation.

More particularly an object of the present invention is to provide mechanism associated with a cam-controlled tool feed for varying the chip thickness in such a manner that breakage of the chip is assured.

Further, it is an object of this invention to provide a variation in chip thickness, using a feed control cam for a gradually changing contour.

A further object is to employ in a turning machine in which the depth of cut is controlled by a movable cam having a gradual slope, means for varying the rate of motion of the cam to thereby cause feed fluctuations much more pronounced than can be obtained by gradual or uniform rate of motion of the cam.

Still another object is to provide a chip-breaking mechanism particularly applicable to a single spindle lathe of the type shown in the application for United States Letters Patent of Herbert H. Ranney, Serial No. 115,804, filed September 15, 1949, for Single Spindle Automatic Lathe.

For a complete understanding of this invention reference may be had to the accompanying drawings in which:

Figures 1 and 2 are front and left end elevational views of a single spindle automtaic lathe embodying the invention.

Figure 3 is a detail sectional view to a larger scale on line 3—3 of Figure 2.

Figure 4 is a detail sectional view on line 4—4 of Figure 3.

Figures 5 and 6 are detail sectional views on lines 5—5 and 6—6, respectively, of Figure 1.

Figure 7 is a detail sectional view on line 7—7 of Figure 4.

Figure 8 is a diagrammatic view illustrating the variations in thickness of the chip which result in its breakage.

Referring to the drawings, Figures 1 and 2 show a single spindle lathe of the type forming subject matter of the application for United States Letters Patent of Herbert H. Ranney, to which reference has heretofore been made.

This machine includes a bed 1 in which is journald horizontally a work-carrying spindle 2 having work clamping means 3 at its forward end which may be closed and opened by axial motion of a spool 4 journaled on the spindle and actuated in suitable timed relation in the cycle of operations of the machine by a lever 5, actuated by cams (not shown), on a cam drum 6 carried by a controlling cam shaft 7 positioned above and in parallel relation to the spindle 2. The cam shaft 7 is arranged to be driven by a cross worm shaft 8 (see Figures 1 and 5) which has a worm 9 thereon meshing with a worm wheel 10 on the cam shaft.

As is common in machines of this general type, the cam shaft is driven alternately at a fast idle speed and at a slow working speed. The fast drive mechanism is derived from a driving motor 11 by means more particularly shown and described in the Ranney application to which reference has been made, this drive being communicated to the worm shaft 8 through a shaft 12 connected to the worm shaft through a suitable clutch, the shifting mechanism for which is shown at 13 in Figure 5, and bevel gears 14 and 15.

For the purpose of this invention, however, the slow speed drive which is the only one which is effective during the tool feed is the only one of interest. This is imparted to the worm shaft 8 when the clutch 13 is open, by mechanism to be described. The work spindle is driven by any suitable means (not shown herein) from the motor 11 continuously during operation of the machine and the slow speed drive is derived from the rotation of the work spindle. The work spindle 2 is provided with a helical gear 15 (see Figures 1 and 6) with which meshes a similar gear 16 on a cross shaft 17 which extends into a casing 18 of the machine bed normally closed by a cover 19. Within this casing 18, the shaft 17 carries a disk 20 having a slideway 21 diametrically thereacross. Within this slideway is mounted a block 22 which is adjustable toward and from the axial center of the disk 20 by the turning of a threaded shaft 23 (see particularly Figure 3) which is journaled in a rim portion 24 of the disk 20. This block 22 has a journal member 25 extending therefrom which can be adjusted by adjustment of the block 22 so that it is eccentric to the axis of the shaft 17 to any desired extent.

Journaled on this journal member 25 is a second block 26 slidable between parallel guides 27 on one arm of a bell crank lever 28 which is fulcrumed at 29 on a fixed pivot. As the shaft 17 rotates therefore, a rocking motion is produced in the bell crank lever 28, the amplitude of which is dependent upon the amount of the eccentricity of the journal 25 with respect to the shaft 17. This rocking motion of the bell crank lever 28 is made to produce a periodic turning of the worm shaft 8, whenever this worm shaft is not driven through the fast speed drive mechanism heretofore mentioned. The opposite arm 30 of the bell crank lever 28 is forked. One branch of the fork has fixed thereto, as by screws 31, an arcuate segment 32 of an internal gear and the other branch of the fork carries a segment 34 of an external gear. The segment 32 meshes with the segment 35 of an external gear projecting outwardly from a ring 36 (see Figures 4 and 7) which is journaled on a hub portion 37, to the outer face of which it is connected by a one direction clutch mechanism comprising three rollers 38 seated in tapering depressions 39 in the hub 37 and urged into clutching engagement with the ring 36 as by springs 40. This arrangement is such, as may be seen by an inspection of Figure 7, that when the ring 36 is rotated in counterclockwise direction, it is clutched to the hub 37 which is thus rotated in the same direction, but during the reverse direction of turning of the ring 36, it is free from clutching engagement with the hub 37, which does not turn in this direction therewith. The segment 34 meshes with a segmental portion 42 of a sleeve 43 and is effective upon the rocking of the lever 28 to turn this sleeve 43 through a small angle in opposite directions. When the sleeve 43 is turned in a counterclockwise direction it is clutched by the roller clutch elements 44 to the inside face of the hub portion 37, the outer face of which is engaged by the roller clutches 38. Thus the hub portion 37 is rotated step by step in counterclockwise direction, as viewed in Figure 7, and relative to the spindle by the rocking of the bell crank lever 28 in each direction and it has a ring portion 45 which is adapted to be clutched to the worm shaft 8 by the closing of the clutch at 46. Bushings and bearing spacers 47 may be interposed between the ring 36 and the hub portion 45 and between this hub portion and the sleeve 43. The clutch 46 is actuated by the shifting of a member 50 having a yoke 51 engaging in a groove 52 in the clutch spool 53. The member 50 is carried by an axially movable rod 54 provided with a rack portion 55 engaged by a gear segment 56. This gear segment forms a portion of a lever 57 which is connected through a link 58 with a suitable arm (not shown) carried by a rock shaft 59 which extends out through the machine casing where it is provided with a handle 60. The shaft 61 which carries the arm 57 also extends out through the casing where it carries a handle 62 by which it may be actuated.

During normal operation the low speed clutch 46 remains closed, and when the high speed clutch 13 is closed, the low speed clutch, including the two one-way roller clutches (previously described), act as an overrunning clutch, which allows the high speed drive to take over the control and drive the worm shaft 8. However, when the high speed clutch is open, the drive is taken over by the low speed clutch and the drive is effected at a variable speed rate, being intermittent, through the rocking of the bell crank lever 28. The rocking of this lever which produces the variable speed drive to the worm shaft 8 acts to turn not only the worm wheel 10 which drives the cam shaft, but it is also effective to rotate a ring 65 arranged coaxial with the work spindle 2, this ring 65 being provided with a worm wheel portion 66. This ring 65 carries at spaced points on its periphery, cams 70, all of which slope inwardly gradually toward the axis of the spindle 2 in one direction, this being in the counterclockwise direction as seen in Figure 5. The direction of rotation of the ring 65 by the rotation of the cam shaft 8 is, however, in clockwise direction. Cooperating with the cams 70 are follower rolls 71 each of which is journaled on a tool slide shown in dotted lines at 72 in Figure 5. These tool slides carry tools 73 and these tools may be moved toward and from the work projecting from the forward end of the spindle by power means such, for example, as hydraulic power, each tool slide being provided with a hydraulic cylinder portion 75 within which is slidably mounted a piston 76. Each piston 76 is provided with a piston rod 77 which is fixed at its outer end and the piston rod may have suitable passages therethrough (not shown) through which fluid under pressure may be introduced into the corresponding hydraulic cylinder at one side of the piston 76 and be discharged from the other side.

As more fully described in the Ranney application to which reference has been made, the tool slides are moved inwardly at suitable times in the cycle of operations until their cam rolls 71 impinge upon the higher portions of the cams 70, at which time the tools are brought nearly into cutting relation to the work piece. As the ring 65 is then rotated at a variable rate of speed, the lower portions of the cam 70 are brought opposite to the cam rollers 71, allowing the hydraulic pressure to feed the tools into the work at a rate controlled by the slopes of the cams 70 and the variable speed rotation of the ring 65. The follower roll 71 follows the inwardly sloping portion of the corresponding cam throughout substantially a complete tooling cycle so that the operative feed is always inwardly so long as any operative feed takes place. If the cam ring 65 were rotated at a constant rate, the rate of tool feed would depend upon this rate and the gradual slopes of the cam 70 which would result in a constant feed into the work, but due to the variable rate of rotation imparted to the ring 65, the tools are allowed to feed in at a variable rate, resulting as shown in Figure 8, in a chip of variable thickness being taken off, having alternate thick and thin portions. This results in the chip breaking at the thinner portions so that it does not come off in a continuous spiral from the work.

Suitable stops such as 78 on the tool slides striking fixed portions of the slide guides may be provided to limit the final inward feed of the tools while the cams might permit further motion so that their final positions are at spaced distances from the work so that the final cut is concentric to the work axis and the work piece is reduced to concentric and accurate cylindrical or circular contour.

As more fully pointed out in the Ranney application, the tools are retracted and further portions of the automatic cycle, including the release of the work piece, its feed and subsequent clamping preparatory to a machining operation, are performed during the high speed rotation of the cam shaft and the ring 70.

From the foregoing description of an embodiment of this invention it should be evident to those skilled in the art that various changes and modifications may be made without departing from its spirit or scope.

I claim:

1. In combination, a rotary work spindle, a tool for operation on work carried by said spindle, a carriage supporting said tool and mounted for motion from and toward the axis of rotation of said spindle, a cam mounted for rotation coaxial with said spindle, a follower for said cam carried by said carriage, means pressing said carriage toward said axis with said follower against said cam to feed said tool against the work as far as permitted by engagement of said follower on said cam, means for turning said cam about said axis relative to said spindle, and stop means limiting the feed motion of said carriage at a predetermined point.

2. In combination, a rotary work spindle, a tool for operation on work carried by said spindle, a carriage supporting said tool and mounted for motion from and toward the axis of rotation of said spindle, a cam mounted for rotation coaxial with said spindle, a follower for said cam carried by said carriage, means pressing said carriage toward said axis with said follower against said cam to feed said tool against the work as far as permitted by engagement of said follower on said cam, said cam having its follower-engaging face inclined toward said axis in one angular direction, and means for turning said cam about said axis relative to said spindle opposite to said angular direction to allow said pressing means to feed said tool relative to the work throughout substantially a complete tooling cycle in accordance with the slope of said cam and its rate of angular motion.

3. In combination, a rotary work spindle, a tool for operating on work projecting from said spindle, a carriage for said tool mounted for motion toward and from the work, means for moving said tool carriage, a ring coaxial with said spindle, a cam projecting from the periphery of said ring, a follower on said carrier for cooperation with said cam and limiting the feed motion of said carrier by contact with said cam, said cam sloping in one circumferential direction toward said spindle axis, a rotary shaft, driving connections from said shaft to said ring, a pair of one direction clutches, means for rotating said shaft in the direction to cause rotation of said ring in said circumferential direction, and means alternately engaging and turning each of said one direction clutch means to thereby intermittently turn said shaft and said ring.

4. In combination, a rotary work spindle, a tool for operating on work projecting from said spindle, a carriage for said tool mounted for motion toward and from the work, means for moving said tool carriage, a ring coaxial with said spindle, a cam projecting from the periphery of said ring, a follower on said carrier for cooperation with said cam and limiting the feed motion of said carrier by contact with said cam, said cam sloping in one circumferential direction toward said spindle axis, a rotary shaft, driving connections from said shaft to said ring, a pair of one direction clutches, means for rotating said shaft in the direction to cause rotation of said ring in said circumferential direction, a forked lever, means carried by the forks of said lever each to engage and rock one of said one direction clutch means as said lever is rocked and in driving direction during opposite directions of rocking of said lever, and means for rocking said lever.

5. In combination, a rotary work spindle, a tool for operating on work projecting from said spindle, a carriage for said tool mounted for motion toward and from the work, means for moving said tool carriage, a ring coaxial with said spindle, a cam projecting from the periphery of said ring, a follower on said carrier for cooperation with said cam and limiting the feed motion of said carrier by contact with said cam, said cam sloping in one circumferential direction toward said spindle axis, a rotary shaft, driving connections from said shaft to said ring, a pair of one direction clutches, means for rotating said shaft in the direction to cause rotation of said ring in said circumferential direction, a forked lever, means carried by the forks of said lever each to engage and rock one of said one direction clutch means as said lever is rocked and in driving direction during opposite directions of rocking of said lever, means for rocking said lever, and means for adjusting the amplitude of rocking of said lever.

References Cited in the file of this patent

UNITED STATES PATENTS

| Number | Name | Date |
|---|---|---|
| 120,593 | Miller | Nov. 7, 1871 |
| 1,798,143 | Dardelet | Mar. 31, 1931 |
| 2,092,202 | Bennett | Sept. 7, 1937 |

FOREIGN PATENTS

| Number | Country | Date |
|---|---|---|
| 678,883 | Germany | July 24, 1939 |